United States Patent [19]
Brugger et al.

[11] Patent Number: 4,539,168
[45] Date of Patent: Sep. 3, 1985

[54] DEVICE AND PROCESS FOR MAKING THIN-WALLED WAX MODELS FOR LOST-WAX CASTING

[75] Inventors: Manfred Brugger, Birmenstorf; Peter Vogt, Mellingen, both of Switzerland

[73] Assignee: BBC Brown, Boveri & Company, Limited, Baden, Switzerland

[21] Appl. No.: 421,100

[22] Filed: Sep. 22, 1982

[30] Foreign Application Priority Data

Oct. 1, 1981 [CH] Switzerland ............... 6326/81

[51] Int. Cl.³ ............................................. B29C 1/02
[52] U.S. Cl. ..................................... 264/102; 164/45; 164/160.1; 164/213; 264/221; 264/225; 264/317; 264/334; 425/176; 425/177; 425/405 R; 425/438; 425/443
[58] Field of Search ................. 425/436 R, 438, 441, 425/352, 443, 175, 176, 177, 408, 405 R; 264/101, 102, 221, 336, 512, 225, 317, 334; 164/7.1, 15, 37, 40, 180, 213, 227, 521, 45, 160.1; 106/38.8

[56] References Cited

U.S. PATENT DOCUMENTS

| 658,680 | 9/1900 | Scheufler et al. | 425/443 |
|---|---|---|---|
| 1,427,149 | 8/1922 | Cook | 264/334 |
| 2,057,540 | 10/1936 | Schmitt | 425/443 |
| 2,135,803 | 11/1938 | Dumert | 425/352 |
| 3,004,291 | 10/1961 | Schad | 425/443 |
| 3,145,423 | 8/1964 | Hovereid | 425/436 R |
| 3,192,578 | 7/1965 | McCormick | 425/175 |
| 3,271,491 | 9/1966 | Mikkleborg et al. | 264/102 |
| 3,673,302 | 6/1972 | Halsall et al. | 264/334 |
| 3,930,780 | 1/1976 | Lovejoy | 425/441 |
| 4,139,176 | 2/1979 | Wündsch | 425/438 |

FOREIGN PATENT DOCUMENTS 7875 of 1911 United Kingdom ................. 164/40

Primary Examiner—James Lowe
Attorney, Agent, or Firm—Oblon, Fisher, Spivak, McClelland & Maier

[57] ABSTRACT

In order to remove a thin-walled wax model adhering to the walls of a first core piece and a second core piece, after solidifying, from a multi-part device for making thin-walled wax models, without damaging the wax model, after the external pressure is released, a mold-opening moment is generated simultaneously and abruptly in axially opposite directions by spring-loaded push-off bolts or directly by leaf springs in the upper parting faces and lower parting faces of the device. As a result, both the lower closing plate and the upper closing plate are separated from the annular casing and the wax model is separated from the core pieces, by a maximum of 3 mm, axially in opposite directions because the adhesion of the wax model to the walls of the core arrangements is overcome simultaneously and abruptly. Subsequently the two core arrangements and the casing are transported away from one another in an axial direction relative to one another, so that the wax model is freed.

6 Claims, 6 Drawing Figures

DEVICE AND PROCESS FOR MAKING THIN-WALLED WAX MODELS FOR LOST-WAX CASTING

BACKGROUND OF THE INVENTION

1. Field of the Invention

The invention relates to a multi-part device for making thin-walled wax models, the device containing a lower closing plate with an arrangement of first cores, and an upper closing plate with an arrangement of second cores, and a laterally located casing for surrounding the wax model to be made.

2. Description of the Prior Art

The wax models required for producing lost-wax castings are made in multi-part devices, the so-called dies or molds. These consist, as a rule, of heat-resistant steel alloys.

After the wax model has solidified in the mold, it has to be removed therefrom. This operation constitutes the most critical stage in the entire production process because the surface-to-volume ratio of the wax model is extremely large and consequently the wax model sticks hard to the core walls of the mold. Since the shaping of the wax model takes place via the liquid/solid phase or, bypassing the liquid phase, in the pasty state at temperatures below the liquidus temperature, relatively high contraction values of the wax and correspondingly greater adhesion of the wax to the core walls are to be expected.

In addition to this, wax is a material which is brittle and has low inherent stability. When the mold is opened, tensile stresses arise in the solidified wax and there is therefore a danger of cracks forming, even when the walls of the core arrangements of the mold are provided with a taper.

A device for removing shaped articles from a shaping housing is known from Swiss Patent Specification No. 548,240. There, a core consisting of pressed sand for producing hollow castings is removed from a shaping housing by means of a diaphragm-like elastomeric disk actuated by compressed air.

The device of said Swiss Patent Specification is suitable for sand casting in which the surface-to-volume ratio of the shaped articles is comparatively smaller than in cast wax models. Moreover in sand casting the requirements demanded in the operation of releasing the shaped article from the shaping housing are nowhere near as stringent as in the shaping of thin-walled wax models in a mold.

The non-destructive release of solidified thin-walled wax models from the walls of the core arrangements therefore presents substantially greater problems than in sand casting and can be carried out only inadequately by the devices known at the present time in the foundry industry.

SUMMARY OF THE INVENTION

The invention achieves the object of providing a device and a process as a result of which wax models for lost-wax casting can, under general production conditions, be made reproducibly, economically and of perfect quality. In order to generate the mold-opening moment between the wax model and the core walls, both in the parting faces between the casing and the lower closing plate and in the parting faces between the casing and the upper closing plate, specifically in the parting faces of the casing and/or of the closing plates, there are arranged at least three springs which can be pressed into their own parting faces by the respective parting faces located opposite them. The springs can exert a pressure on the opposite parting faces, with the result that a repelling force can be achieved simultaneously and abruptly both in the parting faces between the casing and the lower closing plate and in the parting faces between the casing and the upper closing plate.

This device has the following advantage:

Simultaneous, play-free and axially mutual drawing-off of the first and second core pieces from the wax model is achieved.

Because of the simultaneous, abrupt and axially mutual drawing-off of the wax model from the first and second core pieces, a high mold-opening moment acting uniformly on all surface parts of the wax model is achieved, with the result that damage to the wax model is prevented, and this is not possible with the pneumatic or hydraulic drawing-off devices known at the present time which are subject to play.

The springs are each embedded in a bore in the parting faces of the casing and/or lower and upper closing plates and each act on a push-off bolt.

When the springs are relaxed, the travel of the springs is limited by an annular disk, as a result of which the travel for each bolt is the same.

The advantageous effect according to the above is that the spring force which is relieved abruptly acts, symmetrically and free of play, directly on the parting faces of the casing and/or the lower and upper closing plates, thus permitting axial centering when the core pieces are drawn off in opposite directions.

The springs may instead be leaf springs which are embedded in recesses in the two parting faces of the casing and/or upper and lower closing plates and which are fastened inside the recesses by means of part of the leaf springs.

As a result of the arrangement of the leaf springs, a direct transmission of force to the two parting faces of the casing and/or of the lower and upper closing plates, bypassing the push-off bolt, is achieved.

The walls of the cores have a taper of at most 40'. With this size of taper, on the one hand the dimensional accuracy of the lost-wax casing is guaranteed, and on the other hand the drawing-off of the core pieces from the wax model is assisted.

The springs have stress-strain characteristics which vary by not more than ±5%.

As a result, the advantageous effect of the design according to the above is further reinforced.

In the process according to the invention for making wax models the lower closing plate, the upper closing plate and the casing are pressed together, the springs are tensioned and liquid wax is introduced into the free spaces between the core arrangements after previous evacuation. After the wax has solidified, the external pressure on the lower closing plate and the upper closing plate is released simultaneously, with the result that both in the parting faces between the casing and lower closing plate and in the parting faces between the casing and the upper closing plate the springs abruptly separate the lower closing plate together with the first core piece and the upper closing plate together with the second core piece from the casing. They thus also separate the wax model automatically from the core pieces because the adhesion of the wax model to the walls of the core pieces is overcome simultaneously and abruptly, and the two core pieces and the casing are transported away from one another in an axial direction relative to one another, so that the wax model is freed.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views, and wherein.

DETAILED DESCRIPTION OF THE PREFERRED EMBODIMENTS

Figure 1:
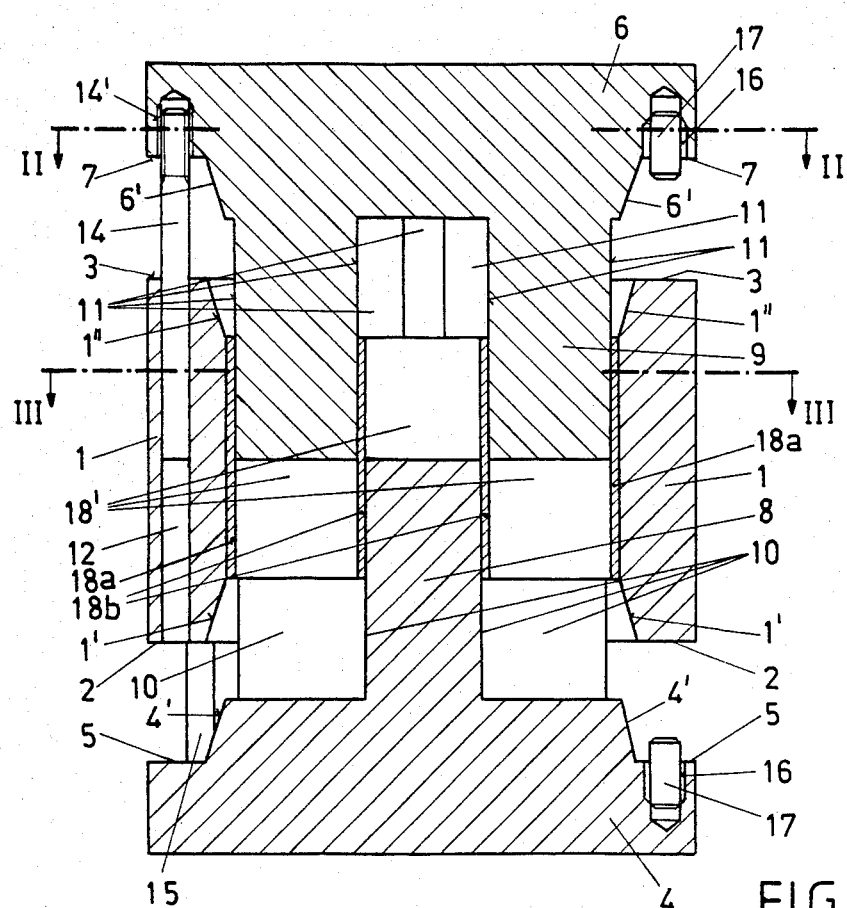
FIG. 1 shows an axial section of the apparatus of the invention, through an annular casing and through a lower and an upper closing plate, including the respective core arrangements and the wax model, the device according to the invention being in a partially opened state.

FIG. 1 illustrates an axial section through an annular casing 1 and through a lower and an upper closing plate, including the respective core arrangements, wherein the wax model of the device according to the invention in a partially opened state.

The annular casing 1 has a lower parting face 2 and an upper parting face 3. The ends of the annular casing 1 are made conical, the lower conical face being designated 1' and the upper conical face 1". Corresponding to this, the lower closing plate 4 has a parting face 5 and a conical face 4', and the upper closing plate 6 has a parting face 7 and a conical face 6'. The parting faces 2 and 3 of the annular casing 1 and the parting faces 5 and 7 of the lower closing plate 4 and the upper closing plate 6 are made in planes and, when the three parts 1, 4 and 6 of the device are closed, rest directly on one another. Likewise, the conical face 1' of the annular casing 1, the conical face 4' of the lower closing plate 4, the conical face 1" of the annular casing 1 and the conical face 6' of the upper closing plate 6 are each made in parallel planes and, when the three parts 1, 4 and 6 of the device are closed, likewise rest directly on one another. The conical faces 1', 1", 4' and 6' guarantee coaxial centering of the annular casing 1 with the lower closing plate 4 and the upper closing plate 6 when the device is closed.

In the embodiment according to FIG. 1, the lower closing plate 4 is made unitary with a first core piece 8 and the upper closing plate 6 is made unitary with a second core piece 9, so that the two core pieces 8, 9 are likewise centered relative to one another when the device is closed. Both the annular casing 1, the lower closing plate 4 and the upper closing plate 6, together with the respective core arrangements 8, 9, are formed of a heat-resistant steel alloy.

In the sectional view of FIG. 1, the walls 10, 11 of the core pieces 8, 9 appear partly as surfaces and partly as straight lines. The tapering of the core walls 10, 11 from their bases on the lower closing plate 4 and upper closing plate 6, respectively, up to their ends is not shown since the taper is very slight and is at most only 40'. The wax model 18 may also be seen, in cross-section, in FIG. 1. The cylindrical surfaces 18a and 18b of the wax model are connected along their entire axial length by webs 18' which can be seen only partially in FIG. 1 since they are concealed partially by the core pieces 8, 9. Although the device is partially opened in FIG. 1, the walls 10, 11 of the core pieces 8, 9 still apparently rest against the wax model 18a, b. In actual fact, only the outer periphery of the wax model 18a rests against the annular casing 1. However, the distances between the walls 10, 11 of the core pieces 8, 9 and the wax model 18a, b are so small that they cannot easily be shown.

In the annular casing 1 there are several bores 12 for upper guide pins 14 and several bores 13 for lower guide pins 15. Only one bore 12 and one upper guide pin 14 and part of a lower guide pin 15 may be seen in FIG. 1. The spring loaded push-off bolts 17 are located in the parting faces 5 and 7 of the lower closing plate 4 and upper closing plate 6 respectively. They are retained in stepped bores 16, only one push-off bolt 17 and one bore 16 in each case being visible in FIG. 1. The push-off bolts 17 and the associated functional parts are illustrated in detail in FIG. 5.

Figure 2:
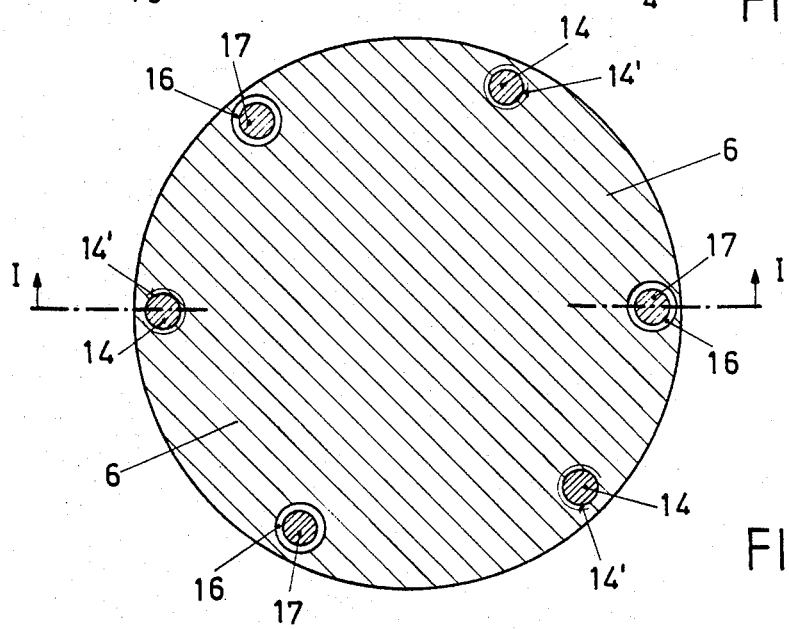
FIG. 2 shows a section II—II of FIG. 1, perpendicular to the axis through the upper closing plate.

In FIG. 2 and in the other Figures, identical functional parts are designated with the same reference numerals as in FIG. 1.

FIG. 2 shows the section II—II from FIG. 1. In the shown embodiment, the stepped bores 16 including the push-off bolts 17 are distributed uniformly over the periphery, and between the bores 16 there are upper guide pins 14 which are connected to the upper closing plate 6 by screw threads 14'.

Figure 3:
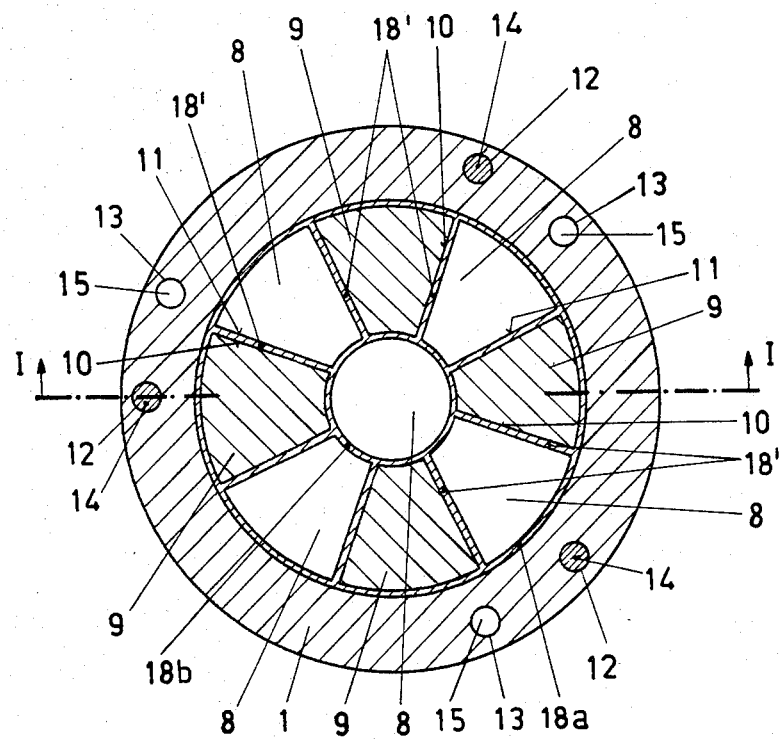
FIG. 3 shows a section III—III of FIG. 1, perpendicular to the axis through the annular casing and through the second core arrangement and the wax model.

FIG. 3 illustrates the section III—III from FIG. 1, showing the arrangement and geometrical shape of the wax model 18 in a radial direction. In this embodiment, the wax model 18 consists of two coaxial cylinders 18a, 18b which are connected to one another by webs 18'. In FIG. 3, the parts of the upper core piece 9, the wax model 18 and the annular casing 1 are shown in cross-section, whilst the parts of the lower core piece 8 are shown in a plan view.

The embodiment of the core pieces 8 and 9 includes a middle part which is an integral part of the lower core piece 8. The distribution of the bores 12, each offset 120°, including the upper guide pin 14, and of the bores 13, each offset 120°, including the lower guide pins 15, may likewise be seen in the sectional plane of the annular casing 1.

Figure 4:
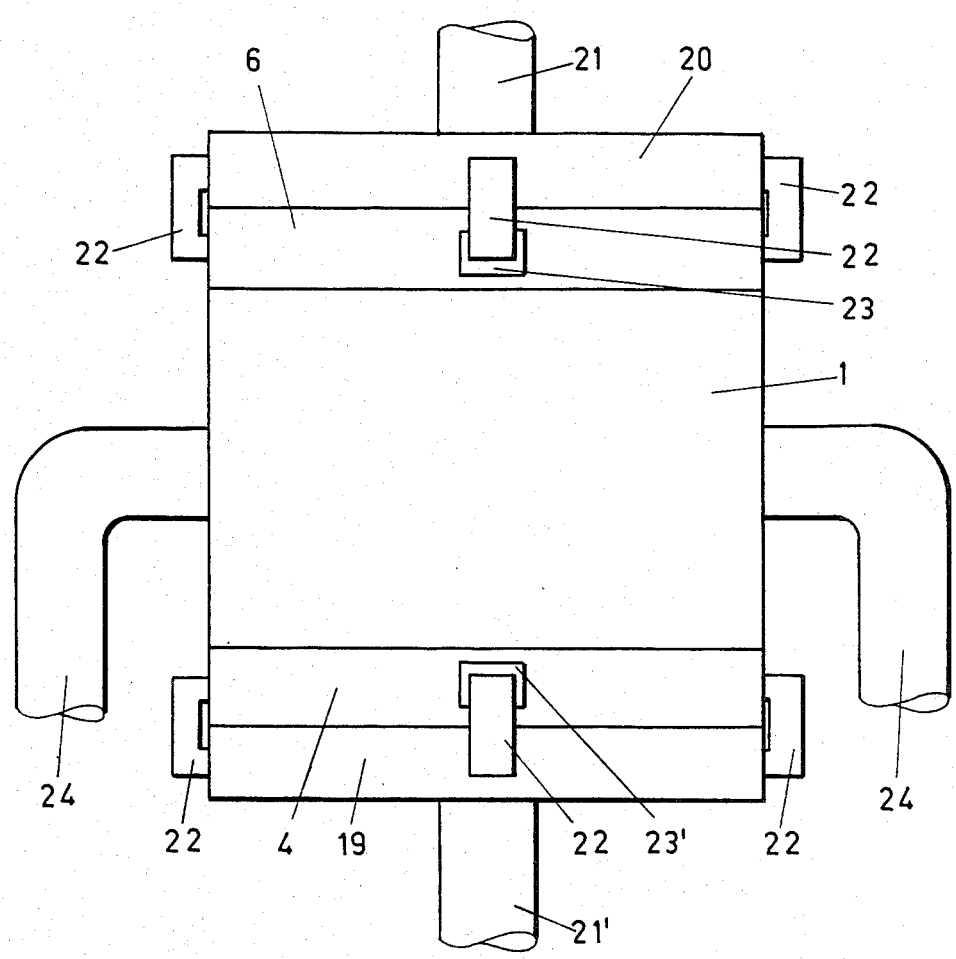
FIG. 4 shows a front view of the device of the invention in the closed state, the accessories necessary for functioning being shown diagrammatically and in simplified form.

FIG. 4 shows an embodiment of the invention including the pressing elements 19, 20, 21 and 21' and the retaining elements 22, 23, 23' and 24, which are being shown simplified. The device is supported by means of a lower press plate 19 of the lower press ram 21' and is pressed downward via the upper plate 20 by the press ram 21. The lower press plate 19 and upper press plate 20 are retained and guided both by the lower press ram 21' and by the upper press ram 21. There are also fastening pieces 22 which connect the lower press plate 19 to the lower closing plate 4 and the press plate 20 to the upper closing plate 6. The fastening pieces 20 are hookshaped and engage in recesses 23, 23' in the upper closing plate 6 and lower closing plate 4. The arrangement of the middle front fastening pieces 22 in the recesses 23, 23' can be seen especially well in FIG. 4. The annular casing 1 is retained and guided, with play, by retaining devices 24, only two of which are shown for the sake of greater clarity.

Figure 5:
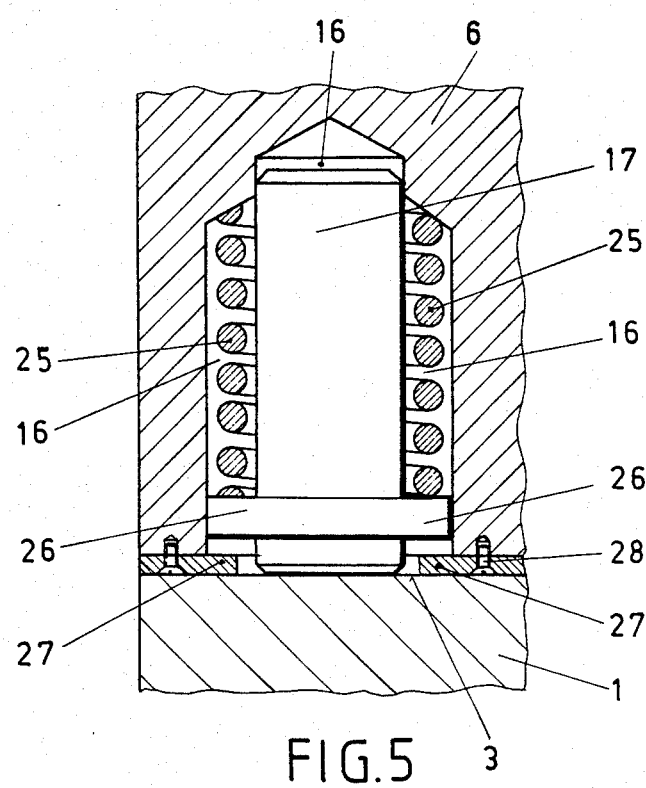
FIG. 5 shows an enlarged partial section of an embodiment of a push-off bolt and a helical spring.

FIG. 5 illustrates an enlarged partial section of an embodiment of the spring-loaded push-off bolt 17 and a helical spring. The push-off bolt 17 is located in the stepped bore 16, the smaller diameter of the stepped bore 16 corresponding to that of the push-off bolt 17 and the larger diameter of the stepped bore 16 being established by the external diameter of the helical spring 25.

FIG. 5 shows the helical spring 25 in the compressed position. It is supported at its lower end on the annular shoulder 26 of the push-off bolt 17 and presses the latter against the parting face 2 or 3 of the annular casing 1. When the pressing force of the press rams 21, 21' on the lower press plate 19 and upper press plate 20 is released, the push-off bolt 17 moves out of the bore 16 until its annular shoulder 26 strikes against the limiting disk 27, and it is consequently prevented from falling out. In the present embodiment, the limiting disk 27 is embedded in the parting face 7 of the upper closing plate 6 and fastened by means of screws 28.

Figure 6:
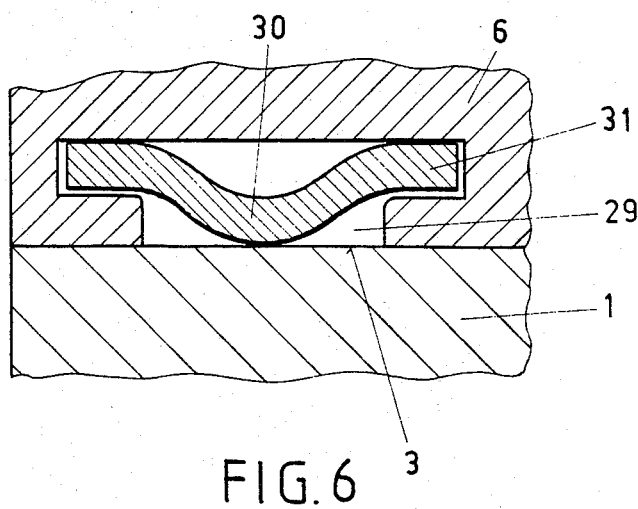
FIG. 6 shows an enlarged section of a further embodiment of a leaf spring.

An alternative form of the spring is shown in FIG. 6. Inserted in a recess 29 is a leaf spring 30 which, in the present example, touches the parting face 3 of the annular casing 1 and has the same function as the spring described in FIG. 5. The leaf spring 30 is retained, without the use of accessories, at its ends 31 in widened portions of the recess 29.

The mode of operation of the device according to the invention is explained in more detail below.

Components known per se and not necessary for the immediate understanding of the mode of operation, for example wax injection channels, have been omitted in the drawing.

The device is ready for operation when all the functional parts are assembled as shown in FIG. 4. The closing plates 4, 6 are pressed hydraulically into the annular casing 1 by and between the press plates 19, 20, so that the conical faces 1', 1'', 4' and 6' center the parts 1, 4 and 6 as well as the lower core arrangement 8 and the upper core arrangement 9 relative to one another. As a result of assembling the device, the push-off bolts 17 are pushed into bores 16 and tensioned, or the leaf springs 30 are pushed into recesses 29 and tensioned. As is evident from FIG. 5, the push-off bolts are tensioned by means of helical springs 25. According to FIG. 6, the leaf springs are tensioned directly by the parting faces 2 and 3 of the annular casing 1. Liquid wax is subsequently introduced between the walls 10, 11 of the lower core piece 8 and upper core piece 9. After the wax has solidified, the external pressure of the press rams 21, 21' on the press plates 19, 20 and on the lower closing plate 4 and upper closing plate 6 is reduced to zero as a result of valve actuation. Because of the incompressibility of the hydraulic oil, the pressure drops immediately, with the result that the spring-loaded push-off bolts 17 or the leaf springs 20 act abruptly on the parting faces 2 and 3 of the annular casing 1, so that the lower closing plate 4 and upper closing plate 6, together with the core pieces 8, 9 are separated form the annular casing 1 and consequently also from the wax model 18 by a distance of approximately 3 mm. This distance corresponds to the distance between the lower part of the annular shoulder 26 of the push-off bolt 17 and the annular limiting disk 27 or is dependent on the characteristics of the leaf spring 30. The springs 25, 30, relieved abruptly in opposite directions, generate the mold-opening moment which is necessary for the wax model 18, sticking as a result of adhesion to the walls 10, 11 of the core arrangements 8, 9, to be severed therefrom. To reduce the mold-opening moment and to protect the wax mold 18 from damage, the core pieces 8, 9 have a taper of at most 40'. After being detached from the core pieces, the wax model 18 is retained by the annular casing 1.

To allow the device to function correctly, the annular casing 1 is retained with play by the retaining devices 24. For the sake of greater clarity, only two retaining devices 24 are shown in FIG. 4.

The opening sequence of the device after the introduced wax has solidified takes place in the steps described below:

1. A mold-opening moment is generated simultaneously and abruptly in axially opposite directions by spring-loaded push-off bolts 17 or directly by leaf springs 30 in the upper parting faces 3, 7 and lower parting faces 2, 5 of the device, and as a result of this the lower closing plate 4 and upper closing plate 6 are separated from the casing 1, and the walls 10, 11 of the core pieces 8, 9 are separated from the wax model 18, 18', by approximately 3 mm.

2. The upper core piece 9 is raised, the wax model 18, 18' being retained by the annular casing 1.

3. The annular casing 1, including the wax model 18, 18' is drawn off from the fixed lower core piece 8.

4. Steps 2 and 3 can be combined by means of additional mechanical and hydraulic devices. In this case, the annular casing 1 is drawn off, for example at half the speed at which the upper core arrangement is raised.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A process for making thin walled wax models for lost wax casting in a device comprising:
a casing having an axis and upper and lower axial faces;
a lower closing plate having an axial face movable into contact with said lower axial face of said casing, said lower closing plate including lower core means movable into said casing;
an upper closing plate having an axial face movable into contact with said upper axial face of said casing, said upper closing plate including upper core means movable into said casing; wherein said lower core means comprise an array of lower core members, each of said lower core members being immovably fixed to said lower closing plate and extending to said upper closing plate when said contacting faces are in contact with one another, each of said lower core members having a tapered diminution from said lower closing plate to the end thereof of 40 minutes of arc or less, wherein said upper core means comprise an array of upper core members, each of said upper core members being immovably fixed to said upper closing plate and extending to said lower closing plate when said contacting faces are in contact with one another, each of said upper core members having a tapered diminution from said upper closing plate to the end thereof of 40 minutes of arc or less, and wherein said upper and lower core members are in mutually alternating positions and define therebetween, together with said casing, continuous channels into which wax may be introduced;

first biasing means in one of said axial face of said upper closing plate and said upper axial face of said casing, said first biasing means biasing the other of said axial face of said upper closing plate and said upper axial face of said casing; and second biasing means in one of said axial face of said lower closing plate and said lower axial face of said casing, said second biasing means biasing the other of said axial face of said lower closing plate and said lower axial face of said casing;

said process comprising the steps of:

applying closing pressure to close said device so that said axial faces of said casing are in contact with respective axial faces of said upper and lower closing plates, so that said upper and lower core means are positioned in said casing and so that said first and second biasing means are tensioned;

evacuating air from free spaces between said upper and lower core means and among said core means and said casing;

introducing liquid wax into said free spaces;

permitting said wax to solidify into said wax model;

abruptly releasing said closing pressure, whereby said axial faces of said casing and said respective axial faces of said upper and lower closing plates are abruptly and simultaneously axially separated by said first and second biasing means and said wax model is separated from said core means; and axially fruther separating said casing, said upper closing plate and said lower closing plate, whereby said wax model is freed.

2. A multi-part device for making thin walled wax models for lost wax casting, comprising:

a casing having an axis and upper and lower axial faces;

a lower closing plate having an axial face movable into contact with said lower axial face of said casing, said lower closing plate including lower core means movable into said casing;

an upper closing plate having an axial face movable into contact with said upper axial face of said casing, said upper closing plate including upper core means movable into said casing; wherein said lower core means further comprise an array of lower core members, each of said lower core members being immovably fixed to said lower closing plate and extending to said upper closing plate when said contacting faces are in contact with one another, each of said lower core members having a tapered diminution from said lower closing plate to the end thereof of 40 minutes of arc or less, wherein said upper core means further comprise an array of upper core members, each of said upper core members being immovably fixed to said upper closing plate and extending to said lower closing plate when said contacting faces are in contact with one another, each of said upper core members having a tapered diminution from said upper closing plate to the end thereof of 40 minutes of arc or less, and wherein said upper and lower core members are in mutually alternating positions and define therebetween, together with said casing, continuous channels into which wax may be introduced;

first biasing means in one of said axial face of said upper closing plate and said upper axial face of said casing, said first biasing means biasing the other of said axial face of said upper closing plate and said upper axial face of said casing; and second biasing means in one of said axial face of said lower closing plate and said lower axial face of said casing, said second biasing means biasing the other of said axial face of said lower closing plate and said lower axial face of said casing;

wherein said first and second biasing means further comprise means for simultaneously and abruptly separating said upper and lower closing plates from said casing.

3. The device of claim 2 wherein each said first and second biasing means comprises:

a plurality of axial bores uniformly circumferentially spaced in said one of said axial face of said casing and a corresponding closing plate;

a push off bolt axially movable in each of said bores;

a spring in each of said bores, each of said springs biasing one of said bolts out of a respective one of said bores.

4. The device of claim 3 including stop means in each of said bores for limiting the travel of each of said bolts to a predetermined distance.

5. The device of claim 2 wherein each of said first and second biasing means comprises:

a plurality of recesses uniformly circumferentially spaced in one of said axial face of said casing and a corresponding closing plate;

a leaf spring in each of said recesses, each said leaf spring including means for retaining said leaf spring in said recess, each said leaf spring including a portion extending out of said recess.

6. The device of claim 3, or 4 or 5 wherein said springs all have the same spring constant ±5%.

* * * * *